United States Patent

Jyomura et al.

[11] 4,119,886
[45] Oct. 10, 1978

[54] PULSE GENERATOR

[75] Inventors: Shigeru Jyomura; Iwao Matsuyama, both of Hachioji; Katsuki Miyauchi, Hino; Tsune Miyashita, Tokyo; Gyozo Toda, Hino, all of Japan

[73] Assignee: Hitachi, Ltd., Japan

[21] Appl. No.: 762,130

[22] Filed: Jan. 24, 1977

[30] Foreign Application Priority Data

Feb. 6, 1976 [JP] Japan .................. 51/11476

[51] Int. Cl.$^2$ .............. C04B 35/46; C04B 35/48; C04B 35/00; H05B 41/14
[52] U.S. Cl. ................. 315/101; 106/73.3; 106/73.31; 106/39.5; 315/DIG. 2
[58] Field of Search ................. 315/101, DIG. 2; 106/73.31, 73.3, 39.5

[56] References Cited

U.S. PATENT DOCUMENTS

| 2,462,306 | 2/1949 | Cook .................. 315/101 |
| 2,960,411 | 11/1960 | Brajer et al. ............ 106/73.3 |
| 3,476,976 | 11/1969 | Morita et al. ............ 315/101 |
| 4,019,915 | 4/1977 | Miyauchi et al. ......... 106/73.31 |

Primary Examiner—O. R. Vertiz
Assistant Examiner—Mark Bell
Attorney, Agent, or Firm—Craig & Antonelli

[57] ABSTRACT

A pulse generator comprising an induction element, and a nonlinear condenser whose dielectric material portion is made of ferroelectric ceramics represented by a general formula of $(Pb_{1-x-y}, Ba_x, Sr_y)(Ti_z, Zr_{1-z})O_3$.

16 Claims, 11 Drawing Figures

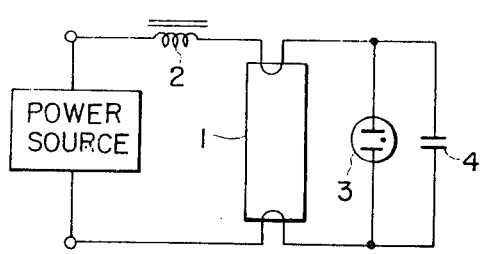
FIG. 1
PRIOR ART
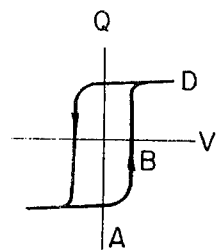
FIG. 3a
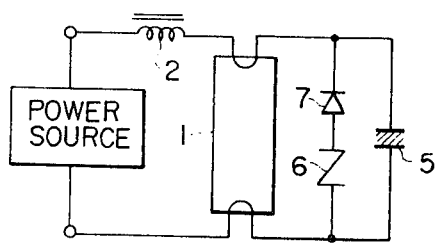
FIG. 2
FIG. 3b
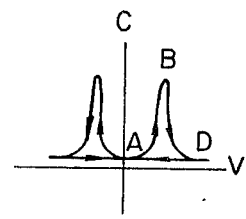
FIG. 3c
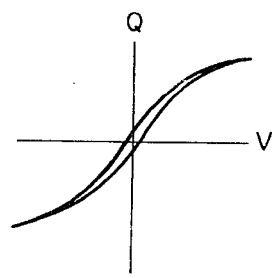
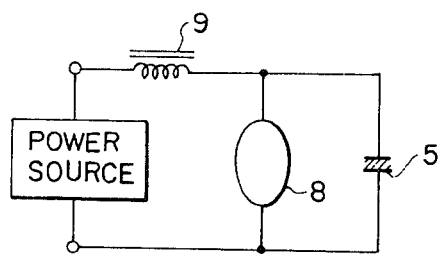
FIG. 4
FIG. 9
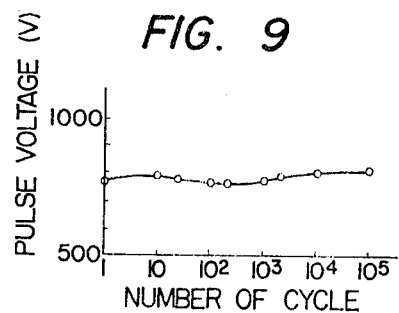

PULSE GENERATOR

BACKGROUND OF THE INVENTION (i) Field of the Invention

This invention relates to a pulse generator in which an inductive element and a nonlinear condenser are connected.

(ii) Brief Description of the Prior Art

Regarding a pulse generator in which an inductive element and a nonlinear condenser are connected, there have hitherto been reported examples in which it is employed as a discharge lamp starter in a discharge lamp circuit for a fluorescent lamp, a high pressure discharge lamp or the like. In this case, an inductive ballast for the discharge lamp is used as the inductive element, and single-crystal $BaTiO_3$ is used as the dielectric material of the nonlinear condenser. Since, however, $BaTiO_3$ has a high melting point of 1613° C., it is very difficult to grow the crystal of a size to be put into practical use. Accordingly, the prior-art pulse generator employing $BaTiO_3$ is industrially impractical.

As is well known, a prior-art starter circuit for a fluorescent lamp for domestic use comprises in combination a glow lamp and a choke coil ballast as shown in FIG. 1. In the figure, numeral 1 designates a fluorescent discharge tube, numeral 2 a ballast, numeral 3 a glow lamp, and numeral 4 a condenser for preventing noises. Although the glow lamp in the circuit is inexpensive, it has the disadvantages (1) that the time required for lighting is as long as 3 seconds on the average, (2) that the life is as short as 2 to 3 years in the ordinary uses, etc. One of expedients for compensating for these disadvantages is the system which employs a nonlinear condenser instead of the glow lamp. FIG. 2 shows an example of the fluorescent discharge lamp circuit employing the nonlinear condenser. In the figure, numeral 5 designates a nonlinear condenser, and numerals 6 and 7 denote a silicon symmetrical switch (SSS) and a diode for a preheat circuit, respectively. The nonlinear condenser 5 exhibits a hysteresis characteristic as shown in FIG. 3a as to the quantity of charges Q versus the applied voltage V. The hysteresis characteristic is attained in such a way that the dielectric material portion of the condenser is made of a ferroelectric material. FIG. 3b illustrates the relationship between the capacity C and the applied voltage V of the nonlinear condenser which has the hysteresis characteristic as shown in FIG. 3a. When such nonlinear condenser is assembled in the circuit, the charges Q trace a course ABD in FIG. 3a with the increase of the applied voltage. This becomes as shown in FIG. 3b when observed as the variation of the condenser capacity. That is, a large capacity state B and a small capacity state D of the condenser are alternately realized at every half cycle on the hysteresis curve, and changes just as in case of bringing a switch into the "on" state and the "off" state occur. The variation can generate a high pulse voltage by abruptly cutting off a current flowing through the choke coil. Accordingly, the instant start is possible owing to this operation. The effect by the ferroelectric material as stated above is significant, not only in the circuit of the fluorescent lamp, but also in a circuit of a high pressure discharge lamp such as high pressure mercury lamp and high pressure sodium lamp. FIG. 4 shows an example in the case of employing the nonlinear condenser 5 for the high pressure sodium lamp. In the figure, numeral 8 represents a high pressure sodium lamp, and numeral 9 a ballast. Since the high pressure discharge lamp does not require the preheat as in the fluorescent lamp, the circuit becomes a very simple construction in which merely the nonlinear condenser is connected in parallel with the discharge lamp and the choke coil is incorporated on the power source side.

SUMMARY OF THE INVENTION

An object of this invention is to provide a pulse generator of high practicality in which a highly practical and easily available material for generating a high voltage to be substituted for the $BaTiO_3$ single crystal is employed as the dielectric material of the nonlinear condenser and in which the condenser and the inductive element are connected.

In order to accomplish the object, the pulse generator according to this invention comprises i) an inductive element, and ii) a nonlinear condenser whose dielectric material portion is made of ferroelectric ceramics represented by a general formula of $(Pb_{1-x-y}, Ba_x, Sr_y)(Ti_z, Zr_{1-z})O_3$. One terminal of the nonlinear condenser is connected through the inductive element to one end of an a.c. power source, while the other terminal of the nonlinear condenser is connected to the other end of the power source. In this case, an output appears across both the terminals of the nonlinear condenser. In case where the preheat is required as in a fluorescent lamp, elements for a preheat circuit thereof may be inserted in parallel with the nonlinear condenser. Also in this case, one of filaments of the fluorescent discharge lamp is inserted in series between the one terminal of the nonlinear condenser and the inductive element, while the other filament is inserted in series between the other terminal of the nonlinear condenser and that terminal of the power source to which the inductive element is not connected.

The ferroelectric ceramics having the above-mentioned composition is represented by the general formula of $ABO_3$ (where A and B denote cations) and has the crystal structure of perovskite structure. It is a material of easy sintering, and even a sintered compact exhibits the good characteristics as shown in FIG. 3a. Accordingly, the provision of the ceramics material is easy, and the difficulty of the provision as in the $BaTiO_3$ single crystal having hitherto been known is not involved. In this respect, the industrial advantage of this invention is very great.

$BaTiO_3$ of a sintered compact manufactured by the hot press method is easily provided. However, a condenser employing it exhibits a hysteresis characteristic as shown in FIG. 3c in the quantity of charges Q versus the applied voltage V, the characteristic being inferior in squareness, and it cannot be used for the pulse generator. Further, ceramics which is represented by a chemical formula of $Pb(Zr, Ti)O_3$ and which is known as ferroelectric ceramics very well cannot be used for the pulse generator.

The ceramics employed in this invention is represented by the general formula of $(Pb_{1-x-y}, Ba_x, Sr_y)(Ti_z, Zr_{1-z})O_3$ as stated above. The effect of this invention can always be expected in case where the values $x$, $y$ and $z$ lie in ranges of $0.05 \leq x + y \leq 0.32$ and $z \leq 0.6$ and where the value $z$ is at least a value enough for the ceramics to be a ferroelectric material. In case where the ratio between the quantity of Ba and the quantity of Sr, that is, $x/y$ is 1 or greater, some effect is demonstrated even when the values $x$ and $y$ lie in a range of $0.32 < x + y \leq 0.35$. In case where the composition of the ceramics lies outside the aforecited ranges, the pulse voltage of the pulse generator employing the ceramics is low, and moreover, it is sometimes the situation that no pulse voltage is generated because no ferroelectric material is formed.

As the electrode area of the nonlinear condenser is larger, the pulse voltage to be generated is higher. Usually, therefore, a larger electrode area is desirable. In the pulse generator which is used for the discharge lamp, the condenser may well be put in the lamp. In this case, the electrode area of the condenser is limited by the dimensions of the lamp, and a value of about 1–2 cm$^2$ is practical. The minimum electrode area of the condenser required when it is used for the discharge lamp is about 0.5 cm$^2$.

The thickness $d$ of the ferroelectric ceramics constituting the nonlinear condenser is desirably made smaller than $\sqrt{2}\ E_o/E_c$ where $E_c$ denotes the coercive field and $E_o$ the effective value of the a.c. supply voltage. When the thickness $d$ is greater than the specified value, the electric field to be applied to the ceramics becomes lower than the coercive field, and the condenser cannot reach the state B in FIGS. 3a and 3b. Therefore, the pulse voltage cannot be effectively generated and becomes low. However, when the thickness $d$ is too small, the ceramics becomes low in the mechanical strength and is feared to crack. Accordingly, the lower limit of the thickness $d$ differs depending on the intended use of the pulse generator. It is difficult to be specified, and shall be made a value at which no cracking arises in the particular use. In ordinary uses, the thickness $d$ is desirably made at least 50 μm.

A satisfactory range of the thickness $d$ in the usual practical uses is 100–140 μm in case where the a.c. supply voltage is 100 V in the effective value, and 150–250 μm in case where it is 200 V.

Regarding the inductive element, one having been used in the prior-art pulse generators can be employed as it is. Ordinarily, a choke coil serving also as the ballast for the discharge lamp is employed.

BRIEF DESCRIPTION OF THE DRAWINGS

FIG. 1 shows a prior-art fluorescent lamp circuit which employs a glow lamp,

FIG. 2 shows a fluorescent lamp circuit which employs a nonlinear condenser,

FIG. 3a is a diagram showing the relationship between the quantity of charges and the applied voltage of the nonlinear condenser, FIG. 3b is a diagram showing the relationship between the capacity and the applied voltage of the nonlinear condenser, and FIG. 3c is a diagram showing the relationship between the quantity of charges and the applied voltage of a nonlinear condenser which employs unsuitable ceramics for a dielectric material portion thereof, FIG. 4 shows a high pressure discharge lamp circuit which employs the nonlinear condenser, FIG. 9 is a diagram showing the life of the pulse generator according to this invention.

DESCRIPTION OF THE PRESENTLY PREFERRED EMBODIMENTS

First of all, description will be made of a preferable method for manufacturing ferroelectric ceramics which is employed for the pulse generator according to this invention.

Oxides of metallic elements, or compounds of metallic elements which can easily turn into oxides by heating are weighted and mixed so as to satisfy the general formula of ABO$_3$ (where the portion A consists of Pb and at least one of Ba and Sr, and the portion B consists of both Zr and Ti). A raw material thus prepared is heated and sintered under hot-press conditions of a temperature of 1200°–1500° C. (more preferably, 1300°–1450° C.) and a pressure of at least 70 kg/cm$^2$ (practically preferably, 70–210 kg/cm$^2$) (regarding the time of treatment, 5–20 hours is preferable in practical use and practicable). The details of the composition will be described in examples later. In manufacturing the material, it is effective for enhancing the synthesis that, to the end of promoting the sintering, 1–20 weight-% of PbO is added in excess of the chemical composition intended. A ferroelectric material which has a square characteristic practically sufficient for the pulse generation can be synthesized by this method of synthesis. While the isostatic hot-press sintering, the high pressure synthesis, the sintering of chemically prepared powder, etc. may well be adopted as the method of synthesis, they are impracticable especially in inferior mass-producibility. The conventional sintering technique is not preferable as the method for manufacturing the ferroelectric material for the pulse generator of this invention. It is considered that, since the conventional sintering technique is inferior to the other methods of synthesis in the uniformities of the composition and grain size and in achieving a high density, it becomes difficult to form a practical nonlinear condenser.

The ferroelectric material manufactured as described above can fully satisfy the characteristics of a saturation polarization of at least 10 μΩ/cm$^2$ and a coercive field of at most 10 kV/cm as required for the dielectric material of the nonlinear condenser which is employed in the pulse generator for a discharge lamp starter.

EXAMPLE 1

This example relates to a pulse generator employing ceramics of a solid solution of five elements. The ceramics is represented by a general formula of (Pb$_{1-x}$, Ba$_x$)(Ti$_z$, Zr$_{1-z}$)O$_3$ wherein some of Pb ions of ceramics represented by a general formula of Pb(Zr, Ti)O$_3$ are substituted by Ba ions.

Figure 5:
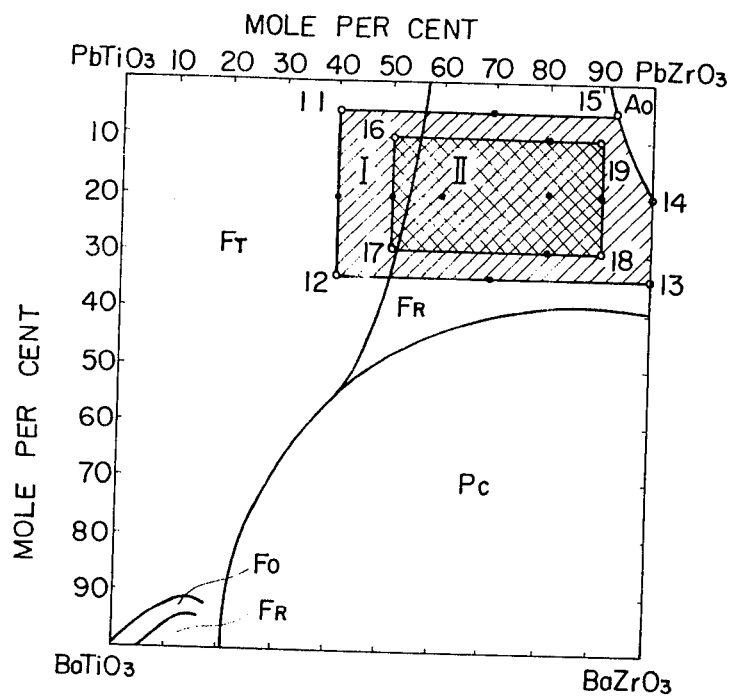
FIG. 5 is a phase diagram of ceramics which is represented by a general formula of (Pb, Ba)(Zr, Ti)O$_3$.

FIG. 5 is a phase diagram of the ceramics of the above-mentioned composition. In the figure, F$_T$, F$_R$, F$_O$, A$_O$, P$_C$ and A$_T$ designate a tetragonal ferroelectric phase, a rhombohedral ferroelectric phase, an orthorhombic ferroelectric phase, an orthorhombic anti-ferroelectric phase, a cubic paraelectric phase and a tetragonal anti-ferroelectric phase, respectively. As apparent from FIG. 5, the ceramics has the three ferroelectric phases of the tetragonal, rhombohedral and orthorhombic ones in dependence on the ratios of the constituent elements. Since, however, the ferroelectric phase in the vicinity of BaTiO$_3$ is difficult to be manufactured by sintering and the sintered material is inferior in the square characteristic as stated previously, the ferroelectric phase cannot be used for the pulse generator.

Hereunder, the synthesis of ceramics of a composition represented by a chemical formula of $(Pb_{0.8}, Ba_{0.2})(Zr_{0.8}, Ti_{0.2})O_3$ will be stated as a typical example.

PbO powder (5.2 microns in the average grain diameter. 99.9% in the purity), $ZrO_2$ powder (2.1 microns, 99.7%) and powder of $BaTiO_3$ solid solution (2.2 microns, 99.9%) were weighed into the aforecited composition. Thereafter, they had distilled water added thereto and were sufficiently mixed by a ball mill. After evaporation and drying and solidification, the mixture was calcined in an oxygen current at 900° C. for 1 hour. The calcined powder was coarsely pulverized by, for example, an agate mortar, had acetone added thereto, and was again subjected to mixing by the ball mill. The resultant powder was heated in an oxygen current at 700° C. for 1 hour, thereby to evaporate and remove the acetone adsorbed to the powder. Subsequently, using dies made of steel, a pressure of 350 kg/cm² was applied to the calcined powder, to mold a green compact of a size of a diameter of 15 mm$\phi$ and a height of 8 mm.

After inserting the green compact into dies made of alumina and setting the dies in an electric furnace, hot pressing was carried out. The sintering method employed here was such that, under the state under which the alumina dies charged with the sample were set within the hot-pressing electric furnace, it was heated at 200°-400° C. and held at a degree of vacuum of $10^{-2}$ Torr for about 1 hour, that oxygen gas was thereafter introduced into the furnace, and that the sample was heated in the oxygen current and hot-pressed under conditions of a temperature of 1400° C. and a pressure of 150 kg/cm² for 5 hours. The density of the sintered compact according to this method was at least 99.8% of the theoretical value.

The hot-pressed sample was taken out from the alumina dies by the use of a core drill made of diamond. The sample was cut to desired dimensions with a diamond cutter, and was polished to a thickness of about 100 μm. Thereafter, silver electrodes each having an area of 1 cm² were attached to the sample. The sample thus obtained was connected to an a.c. power source of 100 V in combination with a ballast of 0.4 H (henry) for a fluorescent lamp, and a pulse voltage was evaluated with the circuit of FIG. 2. Then, the pulse voltage was 730 V, and the fluorescent lamp could be started. The generation of a pulse voltage which can be put into practical use is achieved by a composite which lies in a region I indicated by oblique lines in FIG. 5, i. e., a range surrounded by lines successively joining points 11, 12, 13, 14, 15 and 11. Particularly, a composite which lies in a region II, i. e., a range surrounded by lines successively joining points 16, 17, 18, 19 and 16 is more excellent for the pulse generation. The composition of the region I produces a pulse voltage of at least 180 V, and the composition of the region II a pulse voltage of at least 400 V. Table 1 collectively gives the characteristics of materials as obtained by the example of this invention. The various samples correspond to the materials of compositions indicated by black dots in FIGS. 5–9.

Table 1

| No. | Composition | Voltage generated by Ballast of 0.4 H (Supply Voltage: 100 V) |
|---|---|---|
| 1 | $(Pb_{0.8}, Ba_{0.2})(Zr_{0.8}, Ti_{0.2})O_3$ | 730 (V) |
| 2 | $(Pb_{0.8}, Ba_{0.2})(Zr_{0.9}, Ti_{0.1})O_3$ | 650 |
| 3 | $(Pb_{0.8}, Ba_{0.2})(Zr_{0.6}, Ti_{0.4})O_3$ | 750 |
| 4 | $(Pb_{0.8}, Ba_{0.2})(Zr_{0.5}, Ti_{0.5})O_3$ | 400 |
| 5 | $(Pb_{0.8}, Ba_{0.2})(Zr_{0.4}, Ti_{0.6})O_3$ | 210 |
| 6 | $(Pb_{0.9}, Ba_{0.1})(Zr_{0.8}, Ti_{0.2})O_3$ | 500 |
| 7 | $(Pb_{0.95}, Ba_{0.05})(Zr_{0.7}, Ti_{0.3})O_3$ | 180 |
| 8 | $(Pb_{0.7}, Ba_{0.3})(Zr_{0.8}, Ti_{0.2})O_3$ | 430 |
| 9 | $(Pb_{0.65}, Ba_{0.35})(Zr_{0.7}, Ti_{0.3})O_3$ | 200 |
| 10 | $(Pb_{0.8}, Sr_{0.2})(Zr_{0.7}, Ti_{0.3})O_3$ | 670 |
| 11 | $(Pb_{0.8}, Sr_{0.2})(Zr_{0.5}, Ti_{0.5})O_3$ | 400 |
| 12 | $(Pb_{0.8}, Sr_{0.2})(Zr_{0.4}, Ti_{0.6})O_3$ | 250 |
| 13 | $(Pb_{0.9}, Sr_{0.1})(Zr_{0.7}, Ti_{0.3})O_3$ | 610 |
| 14 | $(Pb_{0.9}, Sr_{0.1})(Zr_{0.8}, Ti_{0.2})O_3$ | 570 |
| 15 | $(Pb_{0.95}, Sr_{0.05})(Zr_{0.7}, Ti_{0.3})O_3$ | 250 |
| 16 | $(Pb_{0.75}, Sr_{0.25})(Zr_{0.6}, Ti_{0.4})O_3$ | 450 |
| 17 | $(Pb_{0.7}, Sr_{0.3})(Zr_{0.7}, Ti_{0.3})O_3$ | 180 |
| 18 | $(Pb_{0.8}, Ba_{0.1}, Sr_{0.1})(Zr_{0.8}, Ti_{0.2})O_3$ | 780 |
| 19 | $(Pb_{0.8}, Ba_{0.1}, Sr_{0.1})(Zr_{0.7}, Ti_{0.3})O_3$ | 700 |
| 20 | $(Pb_{0.8}, Ba_{0.15}, Sr_{0.05})(Zr_{0.7}, Ti_{0.3})O_3$ | 680 |
| 21 | $(Pb_{0.8}, Ba_{0.1}, Sr_{0.1})(Zr_{0.5}, Ti_{0.5})O_3$ | 410 |
| 22 | $(Pb_{0.8}, Ba_{0.1}, Sr_{0.1})(Zr_{0.4}, Ti_{0.6})O_3$ | 240 |
| 23 | $(Pb_{0.9}, Ba_{0.05}, Sr_{0.05})(Zr_{0.7}, Ti_{0.3})O_3$ | 650 |
| 24 | $(Pb_{0.7}, Ba_{0.15}, Sr_{0.15})(Zr_{0.7}, Ti_{0.3})O_3$ | 420 |
| 25 | $(Pb_{0.65}, Ba_{0.175}, Sr_{0.175})(Zr_{0.7}, Ti_{0.3})O_3$ | 180 |
| 26 | $(Pb_{0.95}, Ba_{0.025}, Sr_{0.025})(Zr_{0.8}, Ti_{0.2})O_3$ | 200 |
| 27 | $(Pb_{0.9}, Ba_{0.05}, Sr_{0.05})(Zr_{0.9}, Ti_{0.1})O_3$ | 580 |
| 28 | $(Pb_{0.8}, Ba_{0.15}, Sr_{0.05})(Zr_{0.5}, Ti_{0.5})O_3$ | 400 |
| 29 | $(Pb_{0.8}, Ba_{0.15}, Sr_{0.05})(Zr_{0.4}, Ti_{0.6})O_3$ | 210 |
| 30 | $(Pb_{0.7}, Ba_{0.225}, Sr_{0.075})(Zr_{0.6}, Ti_{0.4})O_3$ | 430 |
| 31 | $(Pb_{0.95}, Ba_{0.0375}, Sr_{0.0125})(Zr_{0.7}, Ti_{0.3})O_3$ | 200 |

EXAMPLE 2

This example relates to a pulse generator employing ceramics of a solid solution of five elements which is represented by a general formula of $(Pb_{1-y}, Sr_y)(Ti_z, Zr_{1-z})O_3$ and in which some of Pb ions of ceramics represented by a general formula of $Pb(Zr, Ti)O_3$ are substituted by Sr ions.

Figure 6:
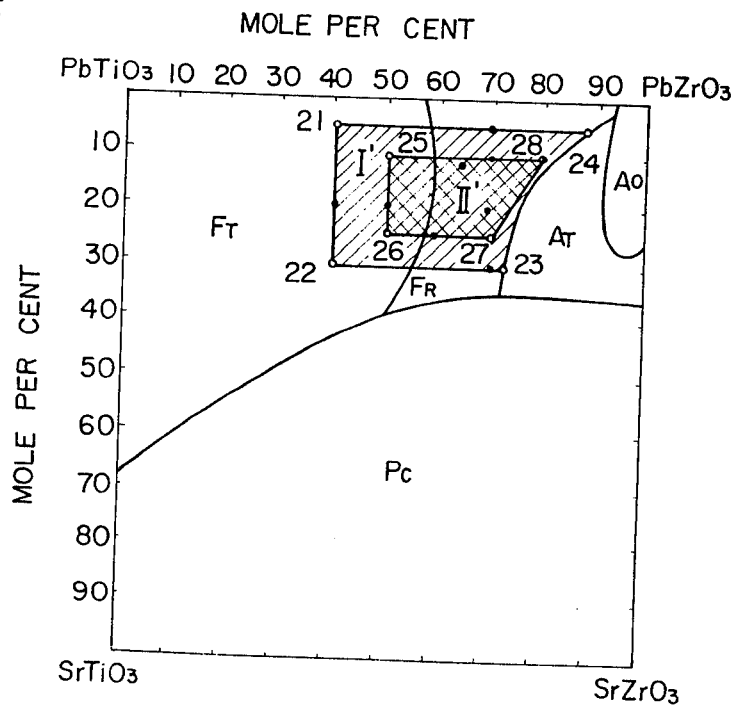
FIG. 6 is a phase diagram of ceramics which is represented by a general formula of (Pb, Sr)(Zr, Ti)O$_3$.

FIG. 6 is a phase diagram of the ceramics of the above-mentioned composition. $F_T$, $F_R$, $A_O$, $P_C$ and $A_T$ in FIG. 6 designate the same phases as in FIG. 5.

In the same way as in Example 1 except that powder of $SrTiO_3$ solid solution (99.9% in purity) was employed instead of the powder of $BaTiO_3$ solid solution, ceramics of a composition represented by a chemical formula of $(Pb_{0.8}, Sr_{0.2})(Zr_{0.7}, Ti_{0.3})O_3$ was synthesized. In the same way as in Example 1, the pulse voltage of a pulse generator employing the ceramics was evaluated. Then, it was 670 V. The density of a sintered compact of the ceramics thus obtained was at least 99.8% of the theoretical value.

In order to generate a pulse voltage which can be put into practical use, there may be employed ceramics of a composition which lies in a region I' indicated by oblique lines in FIG. 6, i.e., a range surrounded by lines successively joining points 21, 22, 23, 24 and 21. In particular, ceramics of a composition which lies in a region II', i.e., a range surrounded by lines successively joining points 25, 26, 27, 28 and 25 is excellent for the pulse generator. A pulse voltage of at least 180 V is obtained in case of employing the ceramics of the composition of the region I', and a pulse voltage of at least 400 V in case of employing the ceramics of the composition of the region II'.

EXAMPLE 3

This example relates to a pulse generator employing ceramics which is respresented by a general formula of $(Pb_{1-x-y}, Ba_y, Sr_x)(Ti_z, Zr_{1-z})O_3$ and in which some of Pb ions of ceramics represented by a general formula of Pb(Zr, Ti)O$_3$ are substituted by Ba ions and Sr ions.

Figure 7:
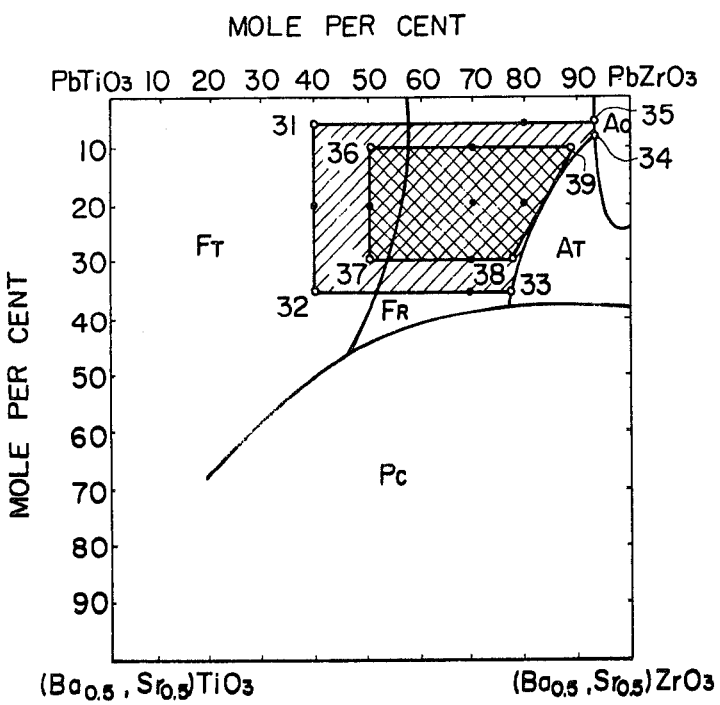
FIG. 7 is a phase diagram of ceramics which is represented by a general formula of (Pb, Ba, Sr)(Zr, Ti)O$_3$ and in which the ratio between the quantity of Ba and the quantity of Sr is 1.
Figure 8:
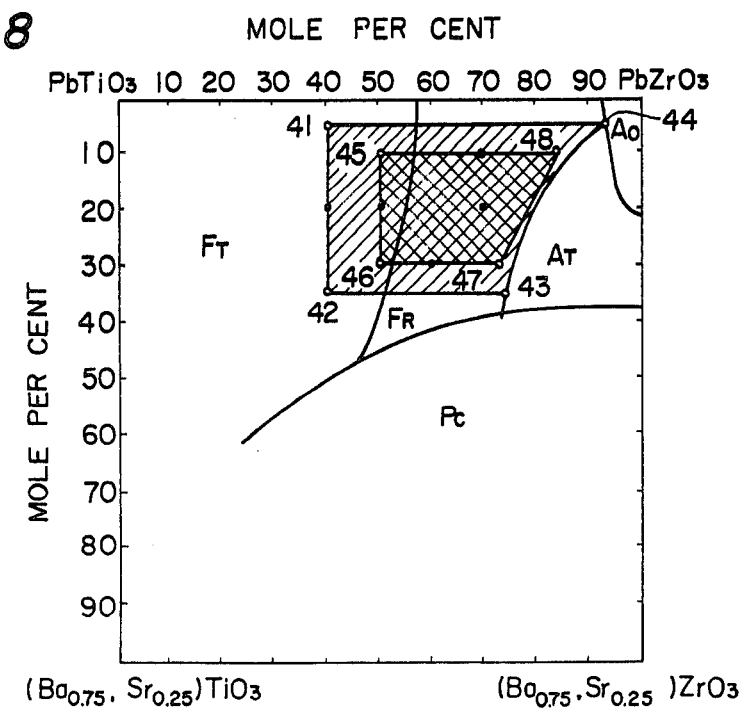
FIG. 8 is a phase diagram of ceramics which is represented by a general formula of (Pb, Ba, Sr)(Zr, Ti)O$_3$ and in which the ratio between the quantity of Ba and the quantity of Sr is 3.

Among the ceramics of the aforecited composition, ceramics of a composition in which the ratio between the quantity of Ba and the quantity of Sr, Ba/Sr is 1 exhibits a phase diagram in FIG. 7, and ceramics of a composition in which the ratio Ba/Sr is 3 exhibits a phase diagram in FIG. 8. $F_T$, $F_R$, $A_O$, $P_C$ and $A_T$ in FIGS. 7 and 8 designate the same phases as in FIG. 5. As understood from FIGS. 5–8, when the quantity of Ti is too small, the ferroelectric phase is not obtained, and the object of this invention is not conformed to. Accordingly, the ceramics for this invention must contain the quantity of Ti necessary for the appearance of the $F_R$ phase in FIGS. 5–8. In the compositions of FIG. 5, however, Ti may be non-existent in case where the quantity of Pb lies in a certain range.

In the same way as in Example 1 except that as the starting raw material, powder of SrTiO$_3$ solid solution was added besides the powders employed in Example 1, ceramics of compositions indicated by chemical formulas of (Pb$_{0.8}$, Ba$_{0.1}$, Sr$_{0.1}$)(Zr$_{0.8}$, Ti$_{0.2}$)O$_3$ and (Pb$_{0.8}$, Ba$_{0.1}$, Sr$_{0.1}$)(Zr$_{0.7}$, Ti$_{0.3}$)O$_3$ were synthesized. When the pulse voltages of pulse generators employing both the ceramics were evaluated by the same method as in Example 1, they were 780 V as to the former composition and 700 V as to the latter composition.

Even when, in this manner, ceramics of compositions in which Sr, Ba etc. were simultaneously contained in the solid solution were synthesized, ferroelectric materials usable for the starting element were produced.

In order that a pulse voltage which can be put into practical use may be generated with the ceramics of the composition in which the ratio between the quantity of Ba and the quantity of Sr, Ba/Sr is 1 or the ceramics of the composition in which the ratio Ba/Sr is 3, there may be adopted ceramics of a composition which lies in a region indicated by oblique lines in FIG. 7, i.e., a range surrounded by lines successively joining points 31, 32, 33, 34, 35 and 31, or a composition which lies in a region indicated by oblique lines in FIG. 8, i.e., a range surrounded by lines successively joining points 41, 42, 43, 44 and 41. In this case, the pulse voltage generated becomes at least 180 V. In particular, ceramics which have a composition of a region surrounded by lines successively joining points 36, 37, 38, 39 and 36 in FIG. 7 and a composition of a region surrounded by lines successively joining points 45, 46, 47, 48 and 45 in FIG. 8 are excellent for the pulse generator. Pulse generators employing the ceramics of the compositions generated pulse voltages of at least 400 V.

FIG. 9 is a diagram showing the relationship between the number of cycles of the pulse generation and the pulse voltage in a pulse generator which employs the ceramics of the composition indicated by the chemical formula of (Pb$_{0.8}$, Ba$_{0.1}$, Sr$_{0.1}$)(Zr$_{0.8}$, Ti$_{0.2}$)O$_3$. The pulse generator was fabricated in order to study the life thereof. A nonlinear condenser employing the ceramics was used in the fluorescent lamp circuit shown in FIG. 2. One cycle was made 30 seconds which consisted of a lighting period of the fluorescent lamp of 3 seconds and an extinction period of the subsequent 27 seconds. The relationship between such number of cycles and the pulse voltage is illustrated in FIG. 9. As apparent from the figure, the pulse voltage hardly changes up to the number of cycles of 10$^5$, and the ceramics is extraordinarily stable.

As previously explained, in case where the ceramics of the compositions of this example are prepared by the conventional sintering technique, they exhibit the ferroelectric hysteresis loop as shown in FIG. 3c. They are unsatisfactory for the nonlinear condenser, and cannot be applied to a practical pulse generator.

In Table 1, sample No. 1 corresponds to the sample concretely indicated in Example 1, sample No. 10 corresponds to the sample in Example 2, and samples No. 18 and No. 19 correspond to the samples in Example 3. The ceramics of the other various compositions given in Table 1 were synthesized, they were used in condensers as dielectric materials, the condensers were assembled in pulse generators, and pulse voltages generated were measured. Then, the excellent results as given in Table 1 were attained.

Obviously many modifications and variations of the present invention are possible in the light of the above teachings. It is therefore to be understood that within the scope of the appended claims the invention may be practiced otherwise than as specifically described.

What is claimed is:

1. A pulse generator comprising (i) a condenser having a capacity which varies nonlinearly with voltage, such that current flow thereto may be abruptly cut off during some portion of a voltage cycle, whose dielectric material portion is made of ferroelectric ceramics represented by a general formula of ABO$_3$, wherein A is Pb and at least one of Ba and Sr, and B is selected from Zr or Zr and Ti, and the elements of A and the elements of B in ABO$_3$ are related by the formula (Pb$_{1-x-y}$, Ba$_x$, Sr$_y$)(Ti$_z$, Zr$_{1-z}$)O$_3$, and (ii) an inductive element.

2. The pulse generator according to claim 1, wherein one terminal of said condenser is connected to one end of a power source through said inductive element, and the other terminal of said condenser is connected to the other end of said power source.

3. The pulse generator according to claim 1, wherein the values $x$, $y$, and $z$ in said formula lie in ranges satisfying $0.05 \leq x + y \leq 0.32$ and $z \leq 0.6$, and the value $z$ is at least a value sufficient for said ceramics to be a ferroelectric material.

4. The pulse generator according to claim 1, wherein said ceramics has a composition which lies in a region surrounded by lines successively joining points 11, 12, 13, 14, 15 and 11 in FIG. 5.

5. The pulse generator according to claim 1, wherein said ceramics has a composition which lies in a region surrounded by lines successively joining points 16, 17, 18, 19 and 16 in FIG. 5.

6. The pulse generator according to claim 1, wherein said ceramics has a composition which lies in a region surrounded by lines successively joining points 21, 22, 23, 24 and 21 in FIG. 6.

7. The pulse generator according to claim 1, wherein said ceramics has a composition which lies in a region surrounded by lines successively joining points 25, 26, 27, 28 and 25 in FIG. 6.

8. The pulse generator according to claim 1, wherein said ceramics has a composition which lies in a region surrounded by lines successively joining points 31, 32, 33, 34, 35 and 31 in FIG. 7.

9. The pulse generator according to claim 1, wherein said ceramics has a composition which lies in a region surrounded by lines successively joining points 36, 37, 38, 39 and 36 in FIG. 7.

10. The pulse generator according to claim 1, wherein said ceramics has a composition which lies in a region surrounded by lines successively joining points 41, 42, 43, 44 and 41 in FIG. 8.

11. The pulse generator according to claim 1, wherein said ceramics has a composition which lies in a region surrounded by lines successively joining points 45, 46, 47, 48 and 45 in FIG. 8.

12. The pulse generator according to claim 1, wherein the values $x$, $y$ and $z$ in said formula lie in ranges satisfying $0.05 \leqq x + y \leqq 0.35$, $z \leqq 0.6$ and $x/y \leqq 1$, and the value $z$ is at least a value sufficient for said ceramics to be a ferroelectric material.

13. The pulse generator according to claim 1, wherein said inductive element is a choke coil.

14. The pulse generator according to claim 2, whereby a preheat circuit is inserted in parallel to said condenser.

15. The pulse generator according to claim 14, wherein said preheat circuit comprises a silicon symmetrical switch in series with a diode.

16. The pulse generator according to claim 1, wherein the dielectric material of the condenser has a thickness of at least 50 $\mu$m.

* * * * *